United States Patent [19]
Feltrin

[11] Patent Number: 5,462,263
[45] Date of Patent: Oct. 31, 1995

[54] MODULAR TOOLING SYSTEM FOR DIE MODEL VERIFICATION

[75] Inventor: Richard A. Feltrin, Ray, Mich.

[73] Assignee: Prototype Systems, Inc., Warren, Mich.

[21] Appl. No.: 110,056

[22] Filed: Aug. 20, 1993

[51] Int. Cl.⁶ ..................................... B23Q 3/00
[52] U.S. Cl. .............................. 269/69; 269/88; 269/266; 269/296; 269/307; 269/900
[58] Field of Search .................................. 269/900, 17, 9, 269/95, 307, 45, 88, 266, 296; 425/470; 249/112, 155

[56] References Cited

U.S. PATENT DOCUMENTS

| | | |
|---|---|---|
| 3,594,940 | 7/1971 | Yomezawa . |
| 3,967,816 | 7/1976 | Ramsperger et al. ................... 269/900 |
| 3,987,579 | 10/1976 | Palenik, III . |
| 4,239,196 | 12/1980 | Hanger ..................................... 269/17 |
| 4,384,839 | 5/1983 | Mayumi et al. . |
| 4,695,032 | 9/1987 | Desport . |
| 5,026,033 | 6/1991 | Roxy . |
| 5,082,464 | 1/1992 | Clink . |
| 5,106,290 | 4/1992 | Carver et al. . |
| 5,107,599 | 4/1992 | Marincic et al. . |
| 5,275,390 | 1/1994 | Brennan .................................... 269/68 |

FOREIGN PATENT DOCUMENTS 2147633   5/1985   United Kingdom .

OTHER PUBLICATIONS

Modular Fixturing, Edward G. Hoffman, 1987, pp. 21, 65–66, 109–117.

Primary Examiner—Robert C. Watson
Attorney, Agent, or Firm—Basile and Hanlon

[57] ABSTRACT

A modular model verification mounting system and method for building and verifying a production tooling verification model with a surface contour made of a workable material is disclosed. The mounting system can include at least one base member for supporting the production tooling verification model. The base member has a first uniform grid of apertures disposed in a first surface at a first predetermined distance from one another. At least one component member is provided for attaching to the base member in cooperation with the first grid of apertures. The component member has a second uniform grid of apertures formed in at least one second surface and disposed at a second predetermined distance from one another. At least one armature is connected to the component member in cooperation with the second grid of apertures. The armature member has at least one custom surface adapted to support the workable material. The component members and armature members are indexable with respect to each other and the base members by registering movement of one member with respect to the other member between coaxial alignment of corresponding apertures in incremental distances equal to the second predetermined distance until positioned as desired. Then the members are secured to one another through the apertures using a suitable fastener.

19 Claims, 4 Drawing Sheets

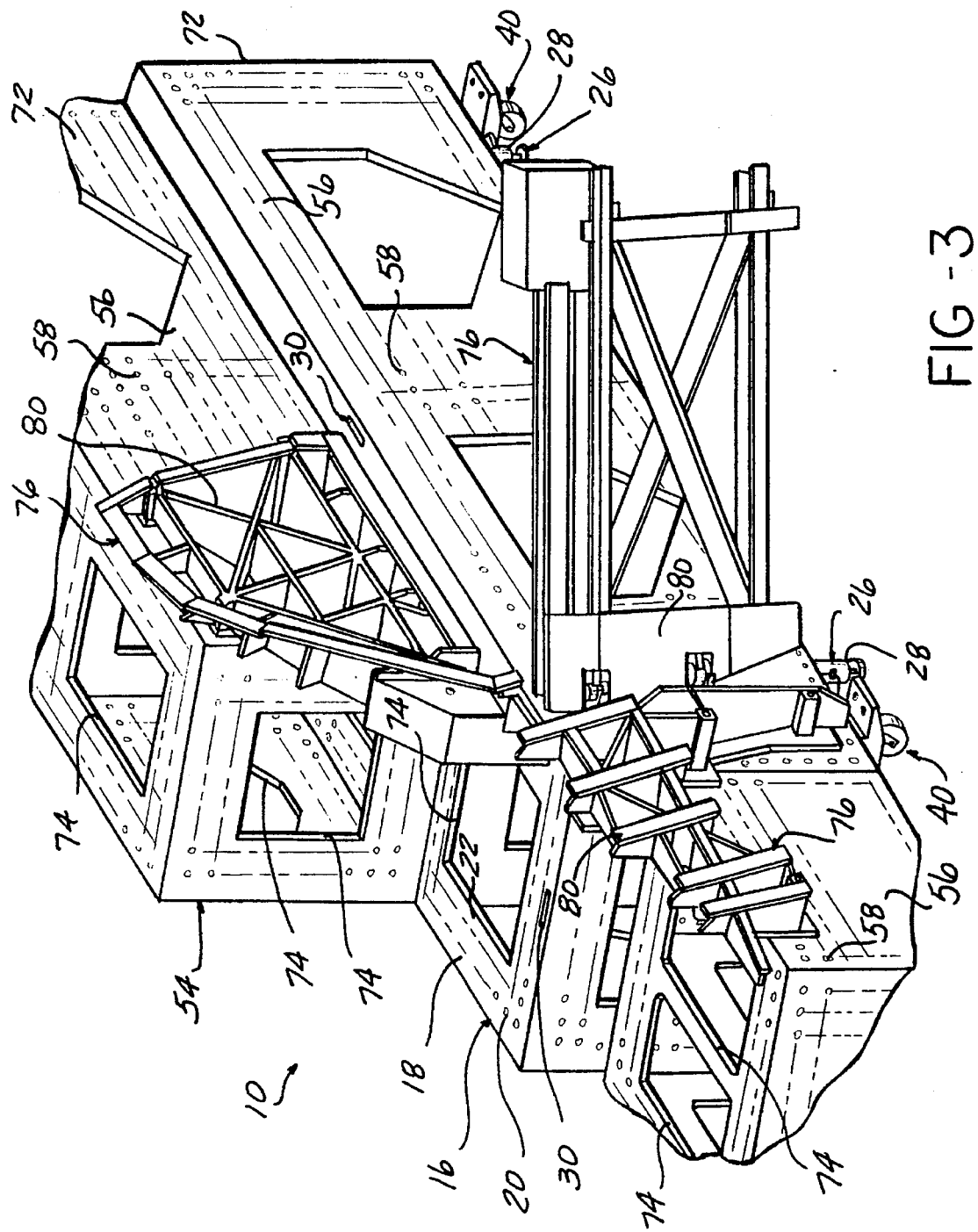

MODULAR TOOLING SYSTEM FOR DIE MODEL VERIFICATION

FIELD OF THE INVENTION

The method and apparatus of the present invention reduces the workpiece set-up time by accurately indexing components with respect to a uniform base to provide attachment surfaces and bore locations having a direct relationship to body line coordinates in the automotive industry, and in particular, the present invention provides components for an interior model review set-up and for an exterior model review set-up.

BACKGROUND OF THE INVENTION

In the past, a framework of "Impreg Mahogany" was created. Impreg mahogany is laminated strips of mahogany bonded with resins which are considered to be carcinogenic. The framework consisted of platforms and support structures that provide attachment surfaces for "armatures". Armatures are tooling bases, again normally made of impreg mahogany, to provide customized support bridging the space between the support structure attachment surfaces of the framework and the finished product surface development. By nature of their design, the armature also provided machining base coordinates for use in manufacturing processes such as Numeric Controlled (NC) machining, and Coordinate Measuring Machines (CMM) inspection.

Impreg mahogany is a German-made product which is carcinogenic. It is now in limited supply, is very expensive and requires toxic waste disposal. In the normal operating methods used with the impreg mahogany product, dimensional accuracy was suspect due to changes in temperature and humidity. In addition, the normal material handling, shipping and storage of the wood base system is more vulnerable to damage. When the design verification process for a particular model year was complete, the wood based system was scrapped.

Before an industry acknowledgement for increased quality, impreg mahogany structures had performed satisfactorily. With the advanced use of Computer Aided Design (CAD), it became apparent when a verification model was considered acceptable, it could be scanned or digitized to actual acceptable surface. The math data from the scanning process would then be fed back into the computer as qualified data. Numerical control (NC) surfacing and cutter path programming would allow product steel dies to be cut. This process reduces the manufacturing process by a time period of about one year. It also minimizes variables associated with previous manufacturing methods.

To ensure the accuracy of the verification model, a more accurate support structure had to be found. Many methods were investigated. The most popular was an extruded aluminum structure fabricated of a product named "Item". This product was widely used, but did not satisfy all the performance requirements.

Various types of other modular tooling systems for models has been proposed. For example, U.S. Pat. No. 5,106,290 discloses a tool system for an integrated manufacturing and assembly system that includes a plurality of profile boards which are connected together with connector boards. The profile board includes a profile edge which defines a mold line surface. U.S. Pat. No. 4,695,032 discloses a convertible mold having a frame including bars and beams carrying movable heads that support a lattice of slats in a desired configuration. A conforming sheet material is fixed to the slats to provide a mold surface. Universal fixtures have also been disclosed for Coordinate Measuring Machines (CMM) as can be seen for example in U.S. Pat. No. 5,107,599 and U.S. Pat. No. 5,026,033.

SUMMARY OF THE INVENTION

It is desirable in the present invention to provide a modular tooling system for production tooling verification model assembly. It is also desirable in the present invention to provide machining base coordinates for use in the manufacturing process such as NC machining or CMM inspection. It is further desirable in the present invention to considerably reduce the workpiece set-up time and to provide accurate indexing having a direct relationship to body line coordinates in the automotive industry.

The present invention provides a modular model verification mounting system for building and verifying a production tooling verification model with a surface contour made of a workable material. The system of the present invention includes at least one base means for supporting the production tooling verification model and having at least one first surface with a first uniform grid of apertures disposed thereon and at a first predetermined distance from one another. At least one component means is provided for attaching to the base means in cooperation with the first grid of apertures. The component means has at least one second surface with a second uniform grid of apertures disposed thereon at a second predetermined distance from one another. At least one armature means is provided for connecting to the component means in cooperation with the second grid of apertures. The armature means has at least one custom surface adapted to support the workable material.

In the preferred configurations, one or more of the following features may also be provided. Jack means may be provided for leveling each base means independently of one another. The jack means is adjustable to support the base means in a level position and preferably is connected to and carried by the base means. Swivel caster means may also be provided connected to the base means for moving the base means with respect to one another and as a means of transport within the facility. The component means may include at least one component selected from a group including an angle, a stanchion, a bridge bar, a spacer block and a support shelf. Each component may have the second grid of apertures in a four aperture cluster pattern wherein the second distance is equal to at least half of the first distance spacing from center to center of the apertures. Each base means may have the first grid of apertures with the first distance at most equal to 100 millimeters on center from aperture to aperture. Each component means may have the second grid of apertures with the second distance at most equal to 50 millimeters on center from aperture to aperture. The base means may include a plurality of base members, each base member having at least one upper planar surface. The base members may be positionable with respect to one another to form a work platform having a continuous, uniform, flat, planar upper surface. Tie bar means may be provided for securing the plurality of base members with respect to one another to prevent relative movement therebetween. Level sensing means may be provided for displaying a visual indication of level with respect to each base means.

The present invention further discloses a modular model verification mounting system for building and verifying a production tooling verification model with a surface contour made of a workable material comprising the steps of supporting the production tooling verification model with at least one base means having a first uniform grid of apertures disposed on at least one first surface and at a first predetermined distance from one another, attaching at least one component means to the base means in cooperation with the first grid of apertures and having a second uniform grid of apertures disposed on at least one second surface and at a second predetermined distance from one another, and connecting at least one armature means to the component means in cooperation with the second grid of apertures and having at least one custom surface adapted to support the workable material. Additional method steps may include leveling the base means independently of one another with jack means adjustable to support the base means in a level position. Furthermore, the method may include the step of moving the base means with respect to one another on swivel caster means connected to the base means. The method of the present invention may also include the step of securing the base means with respect to one another by tie bar means to prevent relative movement therebetween. The present method may also include the step of displaying a visual indication of level with respect to each base means with level gauging means. In addition, the present invention may include the step of indexing component means with respect to the base means, wherein the first distance is at least equal to two times greater than the second distance.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a perspective view of a second embodiment of the modular tooling system for die model verification according to the present invention, particularly adapted for exterior model review set-up and verification;

DETAILED DESCRIPTION OF THE PREFERRED AND ALTERNATIVE EMBODIMENTS

Figure 1:
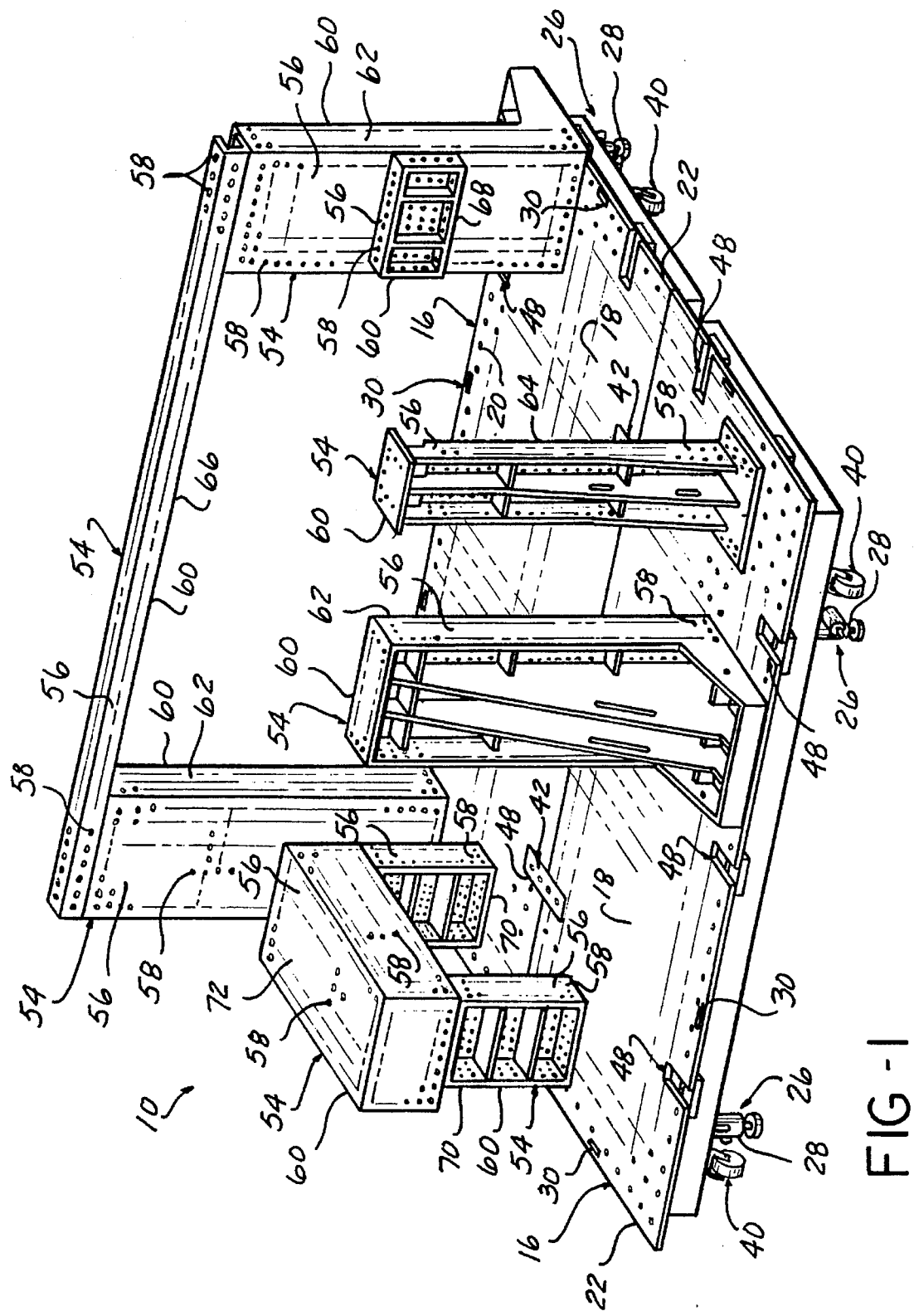
FIG. 1 is a perspective view of a first embodiment of a modular tooling system for die model verification according to the present invention, particularly adapted for interior model review set-up and verification.
Figure 2:
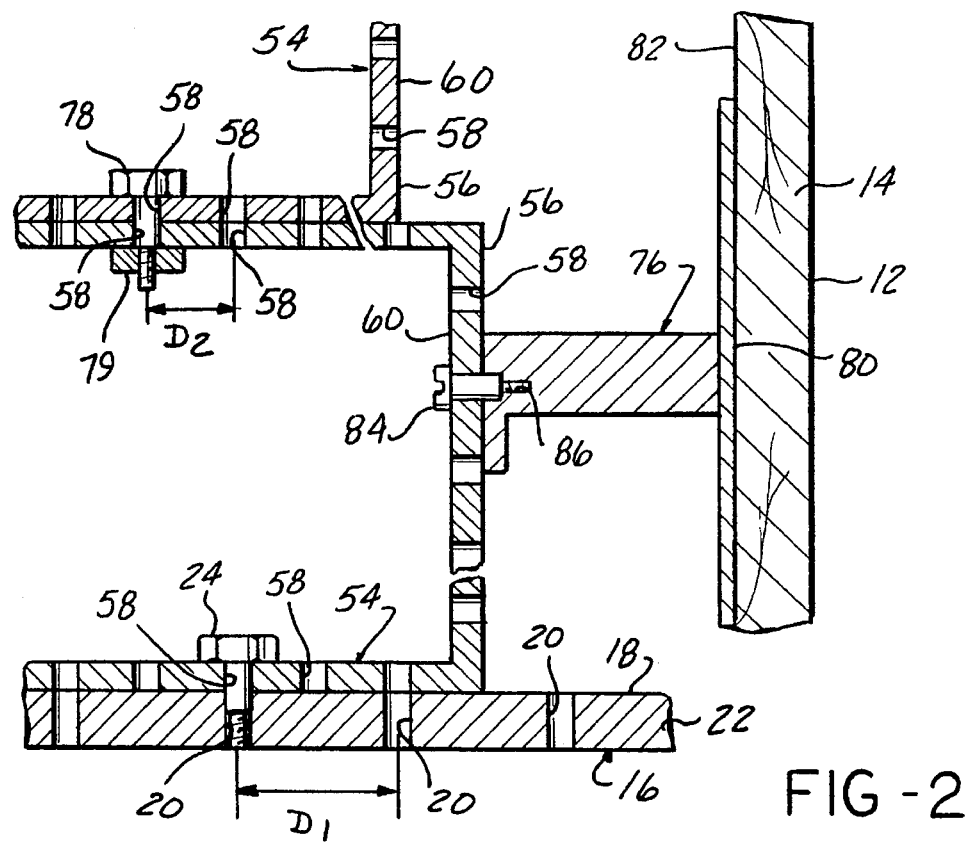
FIG. 2 is a cross-section elevational view of the modular tooling system according to the present invention.

A modular model verification mounting system 10 for building and verifying a production tooling verification model with a surface contour 12 made of a workable material 14 is illustrated in FIGS. 1–4. The mounting system 10 includes at least one base means 16 for supporting the production tooling verification model. The present invention provides for an infinite number and configuration of base means 16. Each base means 16 has at least one first surface 18 with a plurality of first apertures 20. Preferably, the plurality of apertures 20 are disposed in a uniform grid or pattern, where each aperture 20 is spaced at a first predetermined distance $D_1$ from one another as measured from the center line of one aperture 20 to the center line of an adjacent aperture 20, as best seen in FIG. 2. In the present invention, the base means 16 includes a first uniform grid of apertures 20 disposed at a first predetermined distance $D_1$ from one another. In the preferred form of the present invention, the first predetermined distance $D_1$ is approximately equal to 100 millimeters. However, it should be recognized that the mounting system 10 may include or be modified such that the base means 16 includes first apertures 20 on 50 millimeter center to center distances corresponding to the first predetermined distance $D_1$ without departing from the spirit and scope of the present invention. The use of 50 millimeter and 100 millimeter bored aperture locations provides means to relate to a coordinate grid measuring system associated with the design and development of large size products of the transportation industry.

In one configuration, the base means 16 may include a generally flat, planar, horizontal plate member 22 having a first pattern or uniform grid of apertures 20 disposed at a first predetermined distance $D_1$ from one another. In this configuration, each aperture in the plate member 22 is threaded to receive the complementary portion of a threaded shoulder bolt or screw 24 as illustrated in FIG. 2.

Each base means 16 may also include jack means 26 for leveling each base means 16 independently of one another. The jack means 26 is adjustable to support the base means 16 in a level position. The jack means 26 may include a plurality of worm gear jacks 28 connected to a bottom surface of the base means 16 and actuable to orientate the first surface 18 of the base means 16 in a level, generally horizontal plane.

Figure 6:
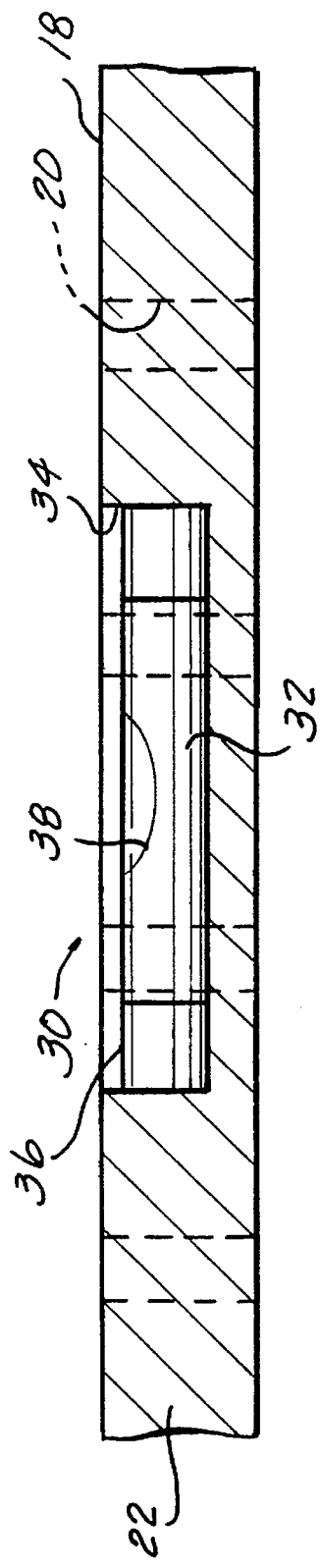
FIG. 6 is a cross-sectional view showing level gauge means for displaying a visual signal representing level with respect to the base means.

The base means 16 may also include level gauge means 30 for displaying a visual indication of level with respect to each base means 16 as illustrated in FIG. 6. The level gauging means 30 may include a plurality of bubble level gauges 32 disposed in pockets 34 formed in the first surface 18 of the base means 16, such that at least two bubble level gauges have longitudinal axes perpendicular to each other to visually indicate the level of the first surface 18 of the base means 16 along two perpendicular axes. The bubble level gauges 32, typically include an elongated enclosed housing 36 partially filled with fluid in order to form a bubble 38 which moves along the longitudinal length of the housing 36 as a visual indication of level.

The base means 16 may also include swivel caster means 40 connected to the base means 16 for moving each base means 16 with respect to one another. The swivel caster means mounts on the base means to provide clearance to cubes and with respect to each other and to allow indexing of the base means without removal of the swivel caster means. The swivel caster means 40, when combined with the jack means 26, being operable when the jack means 26 are disengaged allowing each swivel caster means connected to the base means 16 to rollingly contact the floor surface. When a plurality of base means 16 are to be used with one another, the base means 16 are positioned with respect to one another to form a work platform having a continuous, uniform, flat, planar upper surface 18.

Figure 5:
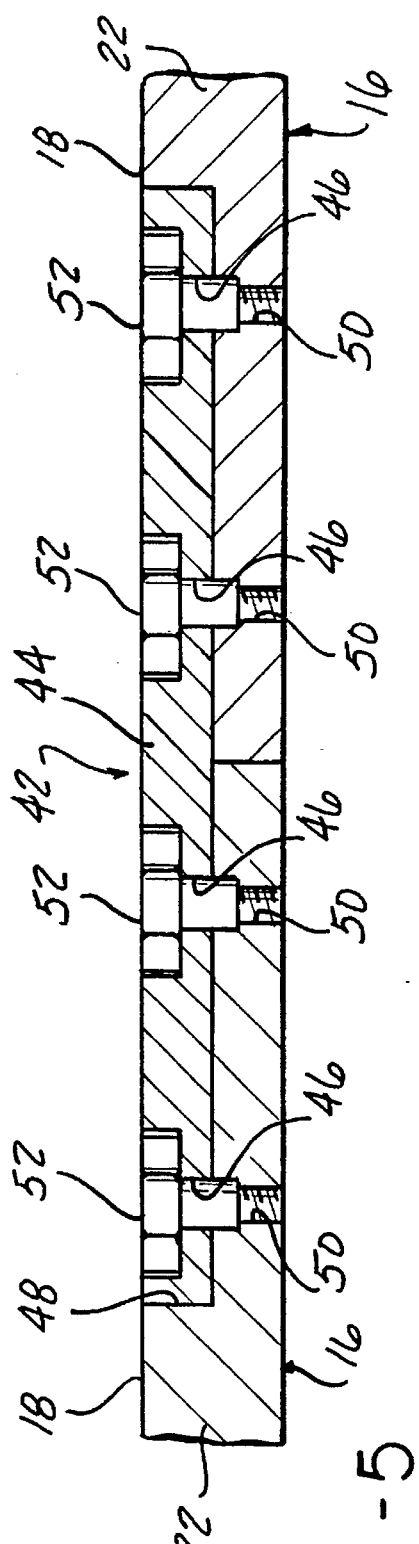
FIG. 5 is a cross-sectional view showing tie bar means for interconnecting adjacent base means according to the present invention.

Tie bar means 42 may be provided for securing the base means 18 with respect to one another to prevent relative movement therebetween. The tie bar means 42 may include a rectangular plate-like member 44 having a plurality of apertures 46 formed therethrough as illustrated in FIG. 5. A plurality of rectangular pockets 48 are formed in the base means 16 and are alignable with one another, such that the rectangular, plate-like member 44 is disposable within the rectangular pocket 48 and the plurality of apertures 46 in the plate-like member 44 align with threaded apertures 50 formed in the bottom surface of the rectangular pockets 48 of the base means 16. Threaded shoulder bolts or screws 52 are provided for securing the plate-like tie bar member 44 to each of the immediately adjacent base means 16 to prevent relative movement between the immediately adjacent base means 16.

The mounting system 10 of the present invention also includes at least one component means 54 for attachment to the base means 16 in cooperation with the first grid of apertures 20 in the first surface 18. The component means 54 has at least one second surface 56 with a plurality of second apertures 58. Preferably, the second apertures 58 are disposed in a uniform grid or pattern with respect to one another. In the preferred embodiment, the second apertures 58 are disposed in a second uniform grid of apertures spaced from one another at a second predetermined distance $D_2$ measured with respect to the center lines of immediately adjacent second apertures 58 as best seen in FIG. 2. Preferably, the second predetermined distance $D_2$ is one-half of the first predetermined distance $D_1$. In the case where the first predetermined distance $D_1$ is equal to 100 millimeters from center line to center line of adjacent apertures 20, the second predetermined distance would preferably be 50 millimeters from center line to center line of apertures 58. Of course, if the base member is provided with first apertures spaced at a first predetermined distance $D_1$ from one another of 50 millimeters, as illustrated in the second embodiment shown in FIG. 3, the second apertures 58 of the component means 54 can be disposed at a second predetermined distance $D_2$ from one another also equal to 50 millimeters, if desired. In other words, the second predetermined distance $D_2$ is at most equal to the first predetermined distance $D_1$. The component means 54 may take a wide variety of shapes and geometric configurations for adaptation to a wide variety of uses. The component means 54 are individually connectable to the base means 16 and are interconnectable with each other to form any desired configuration of mounting system framework. As illustrated in FIGS. 1–3, the component means 54 can include a component member 60 selected from a group including an angle member 62, a stanchion member 64, a bridge bar 66, a spacer block 68, a support shelf 70 and a rectangular, generally box-like member, sometimes referred to as a cube 72. Each component member 60 has a second surface 56 with a second uniform grid of apertures 58. Preferably, the second apertures 58 are in a four aperture cluster pattern, where the second distance $D_2$ is at most equal to 50 millimeters measured from center to center of adjacent second apertures 58. This spacing of second apertures provides indexing of the component member 60 with respect to one another in 50 millimeter increments, and also allows indexing with respect to the base means 16 and corresponding first apertures 20 in 50 millimeter increments. This provides sufficient flexibility to construct the modular model verification mounting system 10 in any desired configuration and easily relates to a coordinate grid measuring system associated with the design and development of large size products of the transportation industry and in particular to CAD data bases relative to a coordinate grid system.

The component means may include a component member 60, such as an angle member 62 as shown in FIG. 1. The angle member 62 preferably includes at least four planar surfaces disposed with at least three of the four planar surfaces at right angles with respect to one another. Each of the four surfaces have a plurality of second apertures 58 disposed thereon. Preferably, three of the planar surfaces extend vertically upward from the base means 16.

The group of component members 60 may also include a stanchion member 64. The stanchion member 64 preferably has at least five planar surfaces with a plurality of second apertures 58 disposed on each of the planar surfaces. At least three of the five planar surfaces are disposed perpendicular to one another. Preferably, at least three of the five planar surfaces extend upwardly from the base means 16.

The group of component members 60 may also include a bridge bar 66. The bridge bar typically takes the form of an elongated bar having a generally C-shaped cross-section defined by three generally planar surfaces. Each of the three surfaces having a plurality of second apertures 58 formed thereon.

The component member 60 may also include within its group a spacer block 68. The spacer block 68 generally has at least five planar sidewalls. At least three of the planar sidewalls are disposed perpendicular to one another. Each of the five planar sidewalls has a plurality of second apertures 58 disposed therein. The spacer block 68 is generally used between two component members 60 to achieve a desired dimension, or between a component member 60 and an armature means 76, described in greater detail below, to achieve a desired dimension.

The group of component members 60 can also include a support shelf 70 having at least five generally planar surfaces. At least three of the five planar surfaces are disposed at perpendicular angles to one another. Each of the five surfaces has a plurality of second apertures 58 disposed therein. The support shelf 70 is typically positioned between the base means 16 and another component member 60. The support shelf 70 typically elevates the other component member 60 to a desired dimension from the base means 16.

Another component member 60 of the group can include a rectangular, generally box-like member or cube 72. The cube 72 has at least six generally planar surfaces, with at least three of the surfaces disposed perpendicular to one another. Each of the six planar surfaces has a plurality of second apertures 58 disposed thereon. Each cube 72 may also include at least one enlarged aperture 74 on at least one of the planar surfaces allowing access to an interior of the cube 72. The enlarged aperture 74 allows access to the interior of the cube 72 to facilitate connecting adjacent component members 60, base means 16 or armature means 76. The cube 74 may be adapted as required to receive front facia pieces, rear facia pieces, front end pieces and instrument panel pieces. For example, a front end cube may have two truncated or angled vertical edges along one side face allowing mounting of a production tooling verification model wrap around bumper. As can best be seen in FIG. 2, the individual components 60 may be connected together through aligned apertures 58 using suitable fastening means, such as a threaded shoulder bolt 78 and nut 79.

As can best be seen in FIG. 3, an alternative configuration of the present invention can modify a lower cube 72 to form an alternative base means 16. The modification of the lower cube 72 may include the addition of jack means 26 as previously described. In addition, the lower cube 72 may also include swivel caster means 40. Furthermore, the lower cube 72 may be modified to include level gauging means 30. The armature means 76 are then connected directly to the lower cube 72. A component member 60, such as upper cube 72, may be attached to the lower cube 72 to receive additional armature means 76 as illustrated in FIG. 3. The cubes are designed with openings to provide attachment access. The cubes are also designed to provide wall surface support such as the gussets and other wall structure designed to carry the load with respect to the jacks as best seen in FIG. 3. The triangular openings are designed to transfer load and provide rigidity to the cube. As should be readily recognized from FIG. 3, an appropriate mounting system or framework can therefore be provided to verify a production tooling verification model with a surface contour, such as for a front corner panel, automotive front door and window assembly as illustrated. As illustrated, the armature means 76 may provide relative movement between the adjacent surface contours in order to verify adequate clearances and the like.

The armature means 76 for use with either embodiment of the base means 16 generally includes at least one custom surface 80 adapted to support the workable material 14 in which the surface contour 12 is formed. At least one armature means 76 is provided for connecting to the component means 54 in cooperation with the second grid of apertures 58. Any suitable connection means may be used to attach the armature means 76 to the component means 54, such as a threaded shoulder bolt or screw 84 receivable in a threaded bore 86 formed in the armature means 76. Typically, the armature means 76 are custom made for each die model verification and currently are made by sand cast aluminum processing. The custom surface 80 of the armature means 76 for supporting the workable material 14 generally corresponds to a rear surface 82 of the workable material 14. Overall cube and component structures are toleranced undersize. Tolerance undersizing minimizes stacking build-up of tolerance. This is done to minimize the cost associated with producing pieces with closer tolerance, while still providing acceptable products for use in model verification process.

Figure 4:
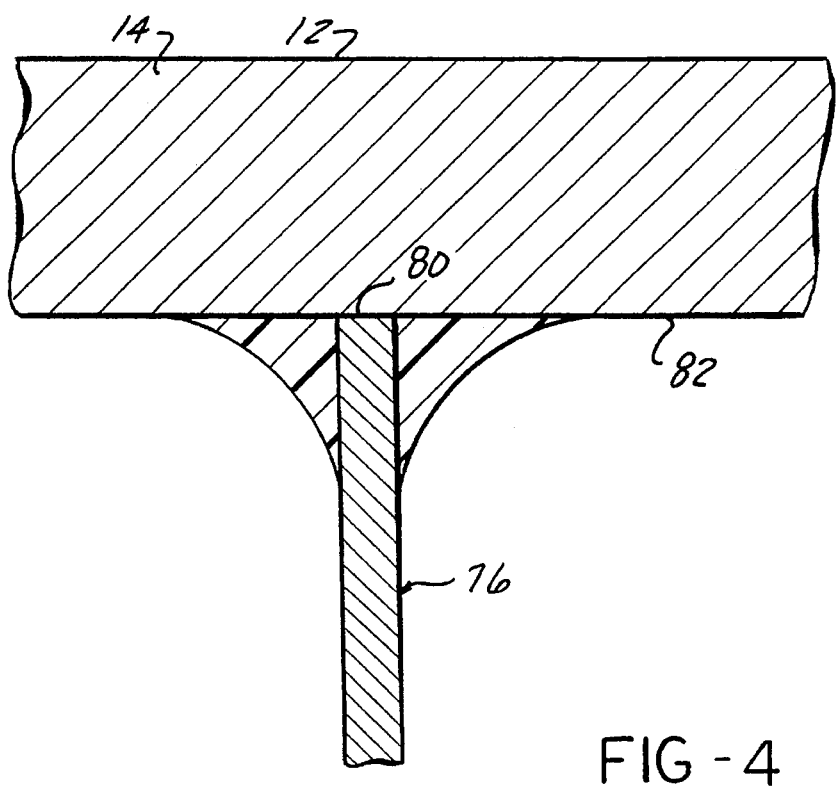
FIG. 4 is a detailed view showing connection of a workable material to an armature means according to the present invention.

Currently, the best mode presently known for practicing the invention incorporates the use of a commercially-available workable material 14 sold under the name REN SHAPE® 450 modeling material manufactured by REN Plastics, located at 4917 Dawn Avenue, in East Lansing, Mich. 48823. This material is easily fabricated and possesses superior dimensional stability. Master patterns and molds constructed from traditional materials, such as laminated wood and plaster, cannot maintain the precise tolerances required by model makers in the automotive, aerospace, foundry and prototyping industries. The REN SHAPE® 450 can be cut to the desired rough shape and attached to the armature custom surface 80 with the use of an epoxy plastic filler typically applied with a one-inch radius as illustrated in FIG. 4. The surface contour 12 can then be machined or carved into the outer surface of the workable material 14 using conventional tools, such as NC machining operations.

The armature means 76 may also be fabricated of other materials, such as fiberglass honeycomb panels, epoxy tubing, steel tubing, aluminum tubing or REN SHAPE® 450 itself. The REN SHAPE® 450 material is a isotropic block material with no grain. It is machinable with standard woodworking tools. The material does not produce any flying dust when planed, milled, sawed or drilled and does not produce odor, even at high cutting speeds. The material is workable to solid, well-defined edges. The material is not susceptible to shrinkage and has low water absorption. Excellent surface detail is attainable with this material.

The present invention is applicable to automotive die models, aerospace master models, NC program proofing, architectural models, nickel electroform mandrels and prototype vacuum forming tools. The present invention provides a system of cast aluminum bases, cubes, angles, stanchions and rails to achieve accurate and known metric autobody X-Y-Z coordinate attachment surfaces. Coordinate bore locations allow indexing of system components together and attachment of armatures. The base system according to the best mode of practicing the present invention has counter-bore and tap provisions located on 100 millimeter centers (optional 50 millimeter centers) coordinating with the millimeter grid systems used in automotive body design. Tie bar provisions index more than one base together to form a work platform, essentially infinite in length and width. The design of the tie bars and their location within the base allows the 100 millimeter grid system to be accurately maintained when more than one base is indexed together. Built-in precision levels and a leveling jacking system provides the means to level each base independently or together when indexed. Jacking adjustment provisions can be provided through the top surface of the bases for ease of access. When not on the jacking system, each base has swivel casters to provide ease of movement for shipping and set-up.

The base system can be used for interior trim verification model development. When used for interior model set-ups, angles, stanchions, cubes and rails are located using the 100 millimeter bore and tap locations on the base. The matching bore locations in the attaching components have a four aperture cluster pattern allowing movement along any axis in 50 millimeter increment locations to body line X-Y-Z coordinates. The coordinate attaching provisions provide the flexibility and movement of assembled components. Various locations to address different set-up requirements are attainable. This feature allows the placement of components to optimize the requirements for armatures.

The cube system typically is used for exterior model set-ups and has all the portability and coordinate value location as previously described for the interior set-up. The cubing system allows armatures to be connected to a modeling base for exterior shapes of automotive vehicles. A primary cube, or lower cube, has leveling and jacking provisions functionally similar to the base member for the interior trim verification model set-up. This primary cube, or lower cube, is then the foundation for different size cubes and stand-offs developed for specific body programs.

In use, the present invention is employed in the following manner. A modular model verification mounting system 10 for building and verifying a production tooling verification model with a surface contour 12 made of a workable material 14 can include the steps of supporting the production tooling verification model with at least one base means 16 having a first surface 18 with a first uniform grid of apertures 20 disposed at a first predetermined distance $D_1$ from one another, attaching at least one component means 54 to the base means 16 in cooperation with the first grid of apertures 20, where said component means 54 has a second uniform grid of apertures 58 disposed on at least one second surface 56 and at a second predetermined distance $D_2$ from one another and connecting at least one armature means 76 to the component means 54 in cooperation with the second grid of apertures 58 where the armature means 76 has at least one custom surface 80 adapted to support the workable material 14. The system of the present invention may also optionally include the step of leveling the base means 16 independently of one another with jack means 28 adjustable to support the base means 16 in a level position. Furthermore, the system of the present invention may also include the step of securing the base means 16 with respect to one another to prevent relative movement therebetween. Displaying a visual indication of level with respect to each base means may also be a step of the present mounting system. Furthermore, the present mounting system may include the step of indexing the component means 54 with respect to the base means 16 by registering movement between coaxial alignment of corresponding first and second apertures, 20 and 58 respectively, in incremental distances equal to the second predetermined distance until the component means 54 is positioned as desired.

Therefore, the present invention as disclosed describes a work set-up method and system for the purpose of indexing and locating components to review and validate automotive product design intent and die models. The cast aluminum cubing and base system provides an accurate and portable foundation, providing body line coordinate mounting and locating of die models. The known incremental location of mounting positions allows individual components of a final product design to be attached and indexed having a relative final production position to each other. The individual elements when assembled to the tooling system represent design intent of the final assembled production product. The design and structural flexibility of the system allows its usage in areas not normally associated with measuring. The system uses 50 millimeter and 100 millimeter bored aperture locations, and provides means to relate to the coordinate grid measuring system associated with the design and development of large size products of the transportation industry. The use of the present system and methods reduces assembly time of the model verification process and provides a more accurate representation of final product development than has been obtained using other previously-known methods. The cost and reusable nature of the present system provides savings over those methods previously used. The method and apparatus of the present invention considerably reduces the workpiece set-up time by accurately indexing cast aluminum cubes and plates to provide attachment surfaces and bore locations having a direct relationship to body line coordinates in the automotive industry. The cubing and base system described has been established to provide components for an interior model review set-up and also to provide components for an exterior model review set-up.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A modular model verification mounting system for building and verifying a production tooling verification model with a surface contour made of a workable material comprising:

a plurality of preforms formed of workable material, each preform having an individual profile formed thereon;

reusable means for accurately registering said plurality of preforms relative to one another for verifying dimensional fit and finish of said individual profiles with respect to one another, said registered plurality of preforms defining an automotive body line with respect to a coordinate measuring system, wherein said reusable means further includes first and second planar base means for supporting said production tooling verification model, each planar base means having a first uniform grid of apertures disposed at a first predetermined distance from one another on a first planar surface, each of said first grid of apertures having threaded portions disposed spaced from said first planar surface by an enlarged diameter counterbore;

tie bar means for connecting said first and second planar base means to one another with said first planar surfaces coplanar with respect to one another;

at least one component means for attaching to said base means in cooperation with said first grid of apertures, said component means having a second uniform grid of apertures disposed at a second predetermined distance from one another, each of said second grid of apertures formed as through bores, said second distance equal to one-half said first distance; and at least one armature means for connecting to said component means in cooperation with said second grid of apertures, said armature means having at least one surface adapted to support said workable material.

2. The modular model verification mounting system of claim 1 further comprising:

jack means for leveling said base means independently of one another, said jack means adjustable to support said base means in a level position.

3. The modular model verification mounting system of claim 1 further comprising:

swivel caster means connected to said base means for moving said base means with respect to one another.

4. The modular model verification mounting system of claim 1 wherein said component means further comprises:

a component selected from a group including an angle, a stanchion, a bridge bar, a spacer block and a support shelf.

5. The modular model verification mounting system of claim 4 further comprising:

each component having said second grid of apertures in a four aperture cluster pattern and said second distance equal to 50 millimeters.

6. The modular model verification mounting system of claim 1 further comprising:

each base means having said first grid of apertures with said first distance at most equal to 100 millimeters.

7. The modular model verification mounting system of claim 6 further comprising:

each component means having said second grid of apertures with said second distance at most equal to 50 millimeters.

8. The modular model verification mounting system of claim 1 further comprising:

level gauging means for displaying a visual indication of level with respect to each base means.

9. A modular model verification mounting system for building and verifying a production tooling verification model with a surface contour made of a workable material comprising:

a plurality of preforms formed of workable material, each preform having an individual profile formed thereon;

reusable means for accurately registering said plurality of preforms relative to one another for verifying dimensional fit and finish of said individual profiles with respect to one another, said registered plurality of preforms defining an automotive body line with respect to a coordinate measuring system, wherein said reusable means further includes at least one rectangular cube-shaped base means for supporting said production tooling verification model, said cube-shaped base means having at least five planar surfaces, wherein three of said five planar surfaces are disposed normal to one another, and said cube-shaped base means having a first uniform grid of apertures disposed at a first predetermined distance from one another on at least one of said five planar surfaces; and at least one armature means for connecting to said rectangular cube-shaped base means in cooperation with said first grid of apertures, said armature means having at least one surface adapted to support said workable material.

10. The modular model verification mounting system of claim 9 further comprising:

a plurality of worm gear jacks for leveling said base members independently of one another, said worm gear jacks adjustable to support each base member in a level position.

11. The modular model verification mounting system of claim 9 further comprising:

swivel caster means connected to each base member for moving said base members with respect to one another.

12. The modular model verification mounting system of claim 1 further comprising:

each base member having said first grid of apertures with said first distance at most equal to 100 millimeters; and each component member having said second grid of apertures with said second distance at most equal to 50 millimeters.

13. The modular model verification mounting system of claim 9 further comprising:

level gauging means for displaying a visual indication of level with respect to each base member.

14. A modular model verification mounting system for building and verifying a production tooling verification model with a surface contour made of a workable material comprising:

at least one base means for supporting said production tooling verification model and having a first uniform grid of apertures disposed at a first predetermined distance from one another;

at least one component means for attaching to said base means in cooperation with said first grid of apertures, said component means having a second uniform grid of apertures disposed at a second predetermined distance from one another;

at least one armature means for connecting to said component means in cooperation with said second grid of apertures, said armature means having at least one surface adapted to support said workable material; and means for building and verifying the production tooling verification model including the steps of:

supporting said production tooling verification model with said at least one base means having the first uniform grid of apertures disposed on said at least one first surface and at said first predetermined distance from one another;

attaching said at least one component means to said base means in cooperation with said first grid of apertures and having the second uniform grid of apertures disposed on said at least one second surface and at the second predetermined distance from one another; and connecting said at least one armature means to said component means in cooperation with said second grid of apertures and having said at least one surface adapted to support said workable material.

15. A modular model verification mounting system for building and verifying a production tooling verification model with a surface contour made of a workable material comprising the steps of:

supporting said production tooling verification model with at least one base means having a first uniform grid of apertures disposed on at least one first surface and at a first predetermined distance from one another;

attaching at least one component means to said base means in cooperation with said first grid of apertures and having a second uniform grid of apertures disposed on at least one second surface and at a second predetermined distance from one another; and connecting at least one armature means to said component means in cooperation with said second grid of apertures and having at least one surface adapted to support said workable material.

16. The modular model verification mounting system of claim 15 further comprising the steps of:

leveling said base means independently of one another with jack means adjustable to support said base means in a level position.

17. The modular model verification mounting system of claim 15 further comprising the steps of:

securing said base means with respect to one another to prevent relative movement therebetween.

18. The modular model verification mounting system of claim 15 further comprising the steps of:

displaying a visual indication of level with respect to each base means.

19. The modular model verification mounting system of claim 15 further comprising the steps of:

indexing said component means with respect to said base means by registering movement between coaxial alignment of corresponding first and second apertures in incremental distances equal to said second predetermined distance until said component means is positioned as desired.

* * * * *